(12) United States Patent
Melnik et al.

(10) Patent No.: US 10,625,438 B2
(45) Date of Patent: Apr. 21, 2020

(54) METAL OR WOOD WORKING EQUIPMENT WITH WORK-PIECE SECURING APPARATUS

(71) Applicant: Melnik Resources Ltd., Mount Brydges (CA)

(72) Inventors: Peter Melnik, Mount Brydges (CA); Travis Adams, Mount Brydges (CA); Scott Ladell, Strathroy (CA)

( * ) Notice: Subject to any disclaimer, the term of this patent is extended or adjusted under 35 U.S.C. 154(b) by 410 days.

(21) Appl. No.: 15/341,395

(22) Filed: Nov. 2, 2016

(65) Prior Publication Data

US 2017/0129127 A1 May 11, 2017

Related U.S. Application Data

(60) Provisional application No. 62/251,769, filed on Nov. 6, 2015.

(51) Int. Cl.
| | | |
|---|---|---|
| *B23D 45/14* | (2006.01) | |
| *B23D 47/04* | (2006.01) | |
| (Continued) | | |

(52) U.S. Cl.
CPC .............. *B27B 25/10* (2013.01); *B23D 45/14* (2013.01); *B23D 47/04* (2013.01); *B23Q 3/06* (2013.01); *B25B 5/06* (2013.01); *B25B 5/163* (2013.01); *Y10T 83/7487* (2015.04); *Y10T 83/758* (2015.04); *Y10T 83/7573* (2015.04); *Y10T 83/7788* (2015.04)

(58) Field of Classification Search
CPC ........ B23D 47/04; B23D 45/14; B23Q 3/002; B23Q 3/005; B23Q 3/06; B27B 25/10; B25B 5/06; B25B 5/163; Y10T 83/745; Y10T 83/748; Y10T 83/7487; Y10T 83/7533; Y10T 83/7573; Y10T 83/758; Y10T 83/7697; Y10T 83/7788
USPC ...... 83/449, 451, 452, 459, 465, 466, 471.3, 83/490; 144/243, 250.2, 253.1, 253.6; 269/254 R
See application file for complete search history.

(56) References Cited

U.S. PATENT DOCUMENTS

| 87,700 | A | * | 3/1869 | Pagett | .................. | B23D 49/007 |
| | | | | | | 144/250.18 |
| 227,876 | A | * | 5/1880 | Blair | ...................... | B27B 27/02 |
| | | | | | | 83/446 |

(Continued)

FOREIGN PATENT DOCUMENTS

| FR | 2 861 317 | * | 4/2005 | ............... | A63F 9/32 |
| GB | 185254 | | 9/1922 | | |

*Primary Examiner* — Clark F Dexter
(74) *Attorney, Agent, or Firm* — Brunet & Co. Ltd; Robert Brunet; Hans Koenig

(57) ABSTRACT

A work-piece securing apparatus for metal or wood working equipment, for example a miter saw, involves a support element mounted on the equipment and an elongated work-piece securing element movably supported by the support element. The support element is configured to receive and support the securing element such that the securing element retains mobility while supported on the support element to permit manual manipulation of the securing element to position the work-piece on the equipment and/or to position a work-piece engaging portion of the securing element at a desired contact point on a work-piece when the work-piece is positioned to be worked by a tool of the equipment.

15 Claims, 9 Drawing Sheets

(51) Int. Cl.
  *B23Q 3/06* (2006.01)
  *B25B 5/06* (2006.01)
  *B25B 5/16* (2006.01)
  *B27B 25/10* (2006.01)

(56) References Cited

U.S. PATENT DOCUMENTS

| | | | | |
|---|---|---|---|---|
| 534,447 A * | 2/1895 | McConnell | ............ | B23Q 3/005 |
| | | | | 144/253.1 |
| 556,658 A | 3/1896 | Barnes | | |
| 653,122 A * | 7/1900 | Shonle | ................... | B23D 47/04 |
| | | | | 83/466 |
| 1,022,176 A * | 4/1912 | Boothby | ................... | B27C 5/06 |
| | | | | 144/243 |
| 2,705,441 A * | 4/1955 | Armstrong | ............... | B23Q 3/06 |
| | | | | 269/91 |
| 2,901,918 A * | 9/1959 | Beamer | ................ | B63H 21/265 |
| | | | | 114/144 A |
| 3,033,379 A * | 5/1962 | Clark | ..................... | D06F 57/08 |
| | | | | 211/200 |
| 3,457,972 A * | 7/1969 | Johnson | ................. | B23Q 3/002 |
| | | | | 144/253.1 |
| 4,002,094 A | 1/1977 | Erickson et al. | | |
| 4,283,977 A | 8/1981 | Batson | | |
| 4,974,650 A * | 12/1990 | Varley | .................... | B23Q 3/002 |
| | | | | 144/129 |
| 5,058,474 A * | 10/1991 | Herrera | .................. | B27B 25/02 |
| | | | | 144/253.1 |
| 5,483,858 A | 1/1996 | Chen | | |
| 5,644,964 A | 7/1997 | Price | | |
| 5,819,623 A | 10/1998 | Sasaki et al. | | |
| 6,543,323 B2 | 4/2003 | Hayashizaki et al. | | |
| 6,568,441 B2 * | 5/2003 | Jones | ..................... | B23Q 3/002 |
| | | | | 144/250.15 |
| 6,591,724 B2 | 7/2003 | Huang | | |
| 7,341,081 B1 * | 3/2008 | Villiger | ................... | B27B 25/02 |
| | | | | 144/253.1 |
| 7,721,632 B2 | 5/2010 | Chen | | |

* cited by examiner

METAL OR WOOD WORKING EQUIPMENT WITH WORK-PIECE SECURING APPARATUS

CROSS-REFERENCE TO RELATED APPLICATIONS

This application claims the benefit of U.S. Patent Application 62/251,769 filed Nov. 6, 2015, which is incorporated herein by reference.

FIELD

This application relates to equipment for working metal or wood, in particular to equipment for working metal or wood with an accessory for securing and/or manipulating work-pieces while using the equipment.

BACKGROUND

Metal and wood working equipment such as power saws (e.g., miter saws, radial arm saws), planers, jointers, table routers, milling machines and the like have high speed tools that shape work-pieces in different ways. Such equipment requires bringing a work-piece into contact with the tool and either moving the work-piece or moving the tool so that the tool may work the workpiece. During operation of the equipment, it is often desirable to temporarily secure the work-piece to permit the tool to work the workpiece cleanly, as undesired movement of the work-piece may lead to unacceptable results and may also present a safety hazard. It is also often desirable to manipulate the work-piece on the equipment to make positional adjustments of the work-piece on the equipment. With metal and wood working equipment, securing and/or manipulating the work-piece is often done by hand by an operator. However, the safety of the operator may be jeopardized if a part of the operator's body (e.g., a hand or fingers) is brought into close proximity of the high speed tool.

It is therefore generally desirable for metal and wood working equipment, in particular power equipment, to provide the ability to temporarily secure a work-piece in position and manipulate the position of the work-piece while improving the safety of the operator. It is also desirable to be able to manipulate the work-piece "on-demand" by providing fine control over where and how the work-piece is secured.

SUMMARY

There is provided a work-piece securing apparatus for metal or wood working equipment, comprising a support element mounted on the equipment and an elongated work-piece securing element movably supported by the support element, the support element configured to receive and support the securing element such that the securing element retains mobility while supported on the support element to permit manual manipulation of the securing element to position the work-piece on the equipment and/or to position a work-piece engaging portion of the securing element at a desired contact point on a work-piece when the work-piece is positioned to be worked by a tool of the equipment.

There is further provided a metal or wood working equipment comprising a base, a work-piece table supported on the base, a material working tool mounted on the base and configured to operate on a work-piece supported on the table, and a work-piece securing apparatus configured to secure the work-piece on the table, the work-piece securing apparatus comprising a support element mounted on the equipment and an elongated work-piece securing element movably supported by the support element, the support element configured to receive and support the securing element such that the securing element retains mobility while supported on the support element to permit manual manipulation of the securing element to position the work-piece on the equipment and/or to position a work-piece engaging portion of the securing element at a desired contact point on a work-piece when the work-piece is positioned to be worked by a tool of the equipment.

The support element is configured to receive and support the securing element. Supporting the securing element may comprise providing a structure on which the securing element may rest so that the securing element may be manipulated while reducing the effect of gravity on the ability of an operator to control the manipulation of the securing element. In one embodiment, the support element may retain the securing element to restrict movement of the securing element along a vertical axis and a first horizontal axis, but not along a second horizontal axis orthogonal to the first horizontal axis, while still permitting vertical and horizontal angling of first and second ends of the securing element. Vertical and horizontal angling of first and second ends of the securing element may occur in a teeter-totter-like manner with the first end angled one way and the second end angled the other way in relation to a fulcrum point located along the securing element at a point where the securing element is supported on the support element. Such support and movement restrictions enhance fine control by the operator over the position that the work-piece engaging portion of the securing element may take on the work-piece. There may be more than one support element mounted on the equipment, for example to provide access to the work-piece from different sides of the tool.

In one embodiment, the support element may comprise a base plate and a securing element mount, the base plate configured to mount the support element on the equipment and the securing element mount selectively movable to and fixedly securable at two or more positions on the supporting element. In one embodiment, the securing element mount may be selectively movable both horizontally and vertically. In one embodiment, the securing element mount may comprise a rod adapter within which the pin is generally vertically selectively movable, the rod adapter comprising a lock for securing the pin within the rod adapter.

In one embodiment, the support element may comprise a through aperture through which the securing element may extend with sufficient tolerance between the edges of the aperture and the securing element to permit vertical and horizontal angling of the elongated element in the aperture. To permit angling of the securing element in the through aperture, the diameter of the through aperture is preferably larger, for example 2-10 times larger, than the distance through of the aperture. Smaller tolerances between the edges of the through aperture benefit from shorter distances through the aperture with respect to the ability to angle the securing element in the aperture. The through aperture may have any cross-sectional shape, for example circular, oval or polygonal (e.g., triangular, square, rectangular, pentagonal and the like). Likewise, the securing element may have any cross-sectional shape, for example circular, oval or polygonal (e.g., triangular, square, rectangular, pentagonal and the like) provided the securing element is capable of fitting through the aperture. In one embodiment, the securing element may comprise a generally cylindrical rod, which allows the rod to be rotated for fine adjustment of the position of the work-piece. In one embodiment, the through aperture may be circular, for example the through aperture may comprise an eye of an eyebolt.

The support element may be mounted on the equipment in a single fixed position or may be mounted on the equipment so that at least a portion of the support element may occupy two or more positions in relation to other parts of the equipment. Being able to move at least a portion of the support element permits further change in the position of the securing element supported thereon in relation to the work-piece, thereby providing greater flexibility of operation. Movement of the at least a portion of the support element is preferably selective insofar as an operator can choose the position. The at least a portion of the support element is preferably fixedly securable at the selectable positions to ensure that the at least a portion of the support element does not move inadvertently.

The at least a portion of the support element may be selectively movable in a direction so that a component of the movement is parallel to one, two or three mutually orthogonal axes. For example, movement between positions may be vertical, parallel to a first horizontal axis and/or parallel to a second horizontal axis perpendicular to the first horizontal axis. In one embodiment, horizontal movement may be provided by a pin movable in a track. In one embodiment the track may be arcuate. Movement in the track may comprise components of movement parallel to one or both horizontal axes. In another embodiment, vertical movement may be provided by a pin vertically movable in a pin holder and selectively securable at two or more vertical positions.

The support element or a portion thereof may also be rotationally movable to change an angle that the elongated securing element makes with the work-piece supported on the equipment. The rotational movement may be selectively securable at two or more angular positions. In one embodiment where the support element comprises a through aperture through which the securing element extends, rotation of the through aperture changes the angle that a central axis through the aperture makes with the work-piece, thereby changing the angle that the elongated securing element makes with the work-piece.

The securing element may be used to temporarily secure the work-piece at a position on the equipment where the work-piece is to be worked by the tool. The securing element may also be used to adjust the position of the work-piece on the equipment. Securement of the work-piece may be accomplished by engaging a work-piece engaging portion of the securing element at a desired contact point on the work-piece and holding the work-piece engaging portion against the work-piece to brace the work-piece against an immovable portion of the equipment, for example a fence and/or a table of the equipment. Adjustment of the work-piece may be accomplished by engaging a work-piece engaging portion of the securing element at a desired contact point on the work-piece and moving the securing element while engaged with the work-piece. Moving the securing element may comprise translating the securing element for coarse changes in the position of the work-piece or rotating the securing element for fine changes in the position of the work-piece. Preferably, the securing element may be manipulated manually by the operator, and the operator may make "as needed" adjustments to the location of the securing element on the work-piece or the position of the work-piece on the equipment while operating the equipment.

The securing element is elongated and comprises first and second ends. The securing element may comprise any suitable material, for example wood, metal, plastic or the like. However, the securing element preferably comprises a material that does not splinter or shatter should the securing element contact the tool while the tool is operating. Preferably, the securing element comprises wood. While the securing element may have any cross-sectional shape, in one embodiment the securing element may be generally cylindrical. In one embodiment, an end of the securing element may have a generally circular cross-section and may be sheathed in a butt sleeve comprising a material with a sufficiently high coefficient of friction to effectively hold the work-piece in place while the operator performs the work or to grip the work-piece while positioning the work-piece on the equipment. In another embodiment, an end of the securing element may have a flat portion comprising a material with a sufficiently high coefficient of friction to effectively hold the work-piece in place while the operator performs the work or to grip the work-piece while positioning the work-piece on the equipment. The securing element may comprise one end that is circular in cross-section and sheathed in a butt sleeve and another end comprising a flat portion. The material with a sufficiently high coefficient of friction may be an elastomeric material. The elastomeric material may be, for example, an ethylene propylene diene monomer (EPDM) rubber, a polyurethane rubber or a natural rubber. The butt sleeve and flat portion may comprise the same or different elastomeric material.

The work-piece securing apparatus may be utilized with any metal or wood working equipment, especially power equipment. Some examples of equipment include a power saw (e.g., a miter saw or a radial arm saw), a powered planer, a powered jointer, a powered table router and a powered milling machine. Miter saws are particularly preferred. The support element of the work-piece securing apparatus when mounted on such equipment may provide new angles of approach for the securing element to enhance effectiveness, comfort and safety when using the securing element to secure and/or manipulate the work-piece on the equipment.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Figure 1:
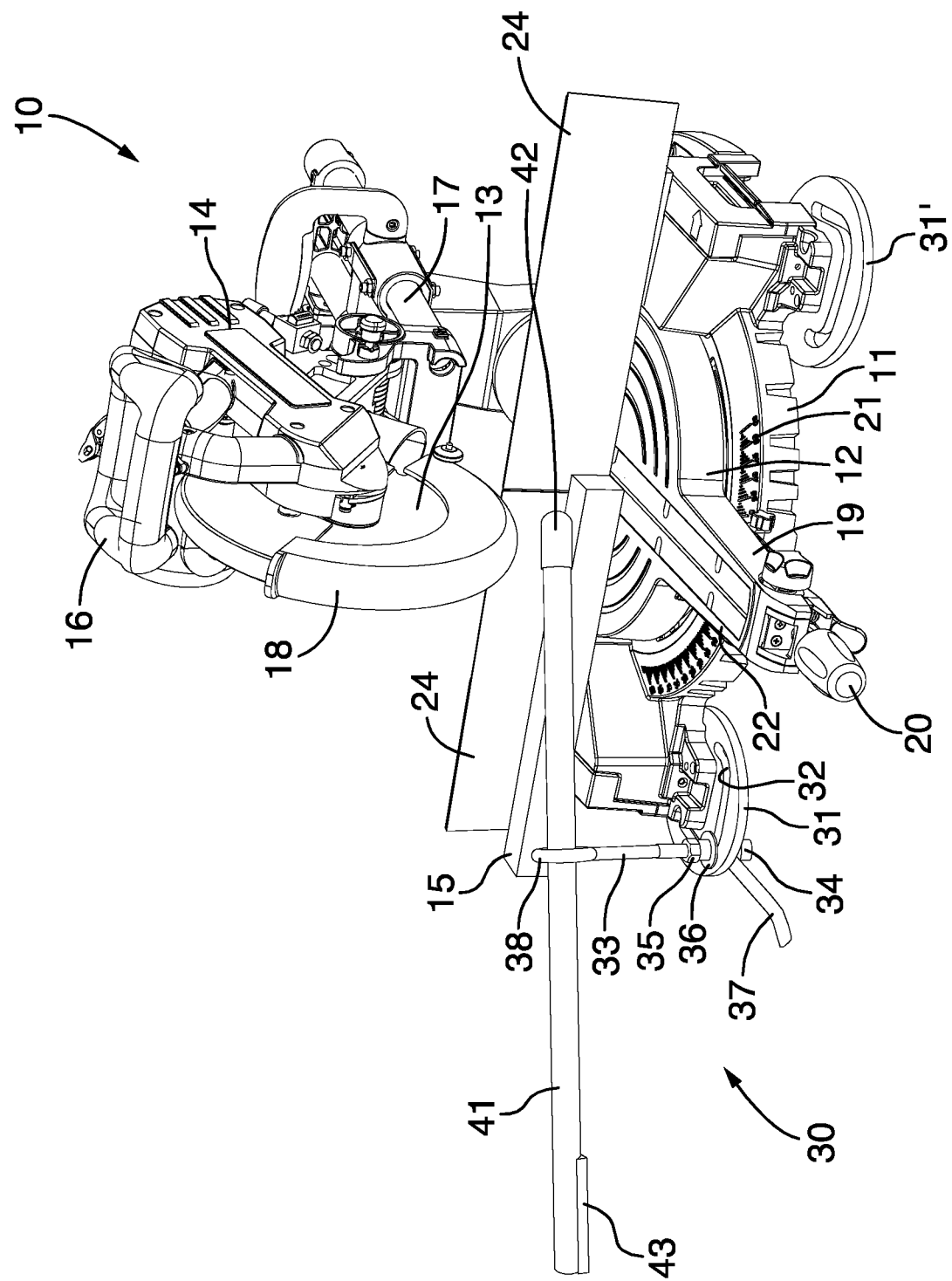
FIG. 1 depicts a miter saw having mounted thereon a first embodiment of a work-piece securing apparatus in which an elongated work-piece securing element comprises a generally cylindrical rod and a support element comprises a horizontally movable eyebolt.
Figure 2:
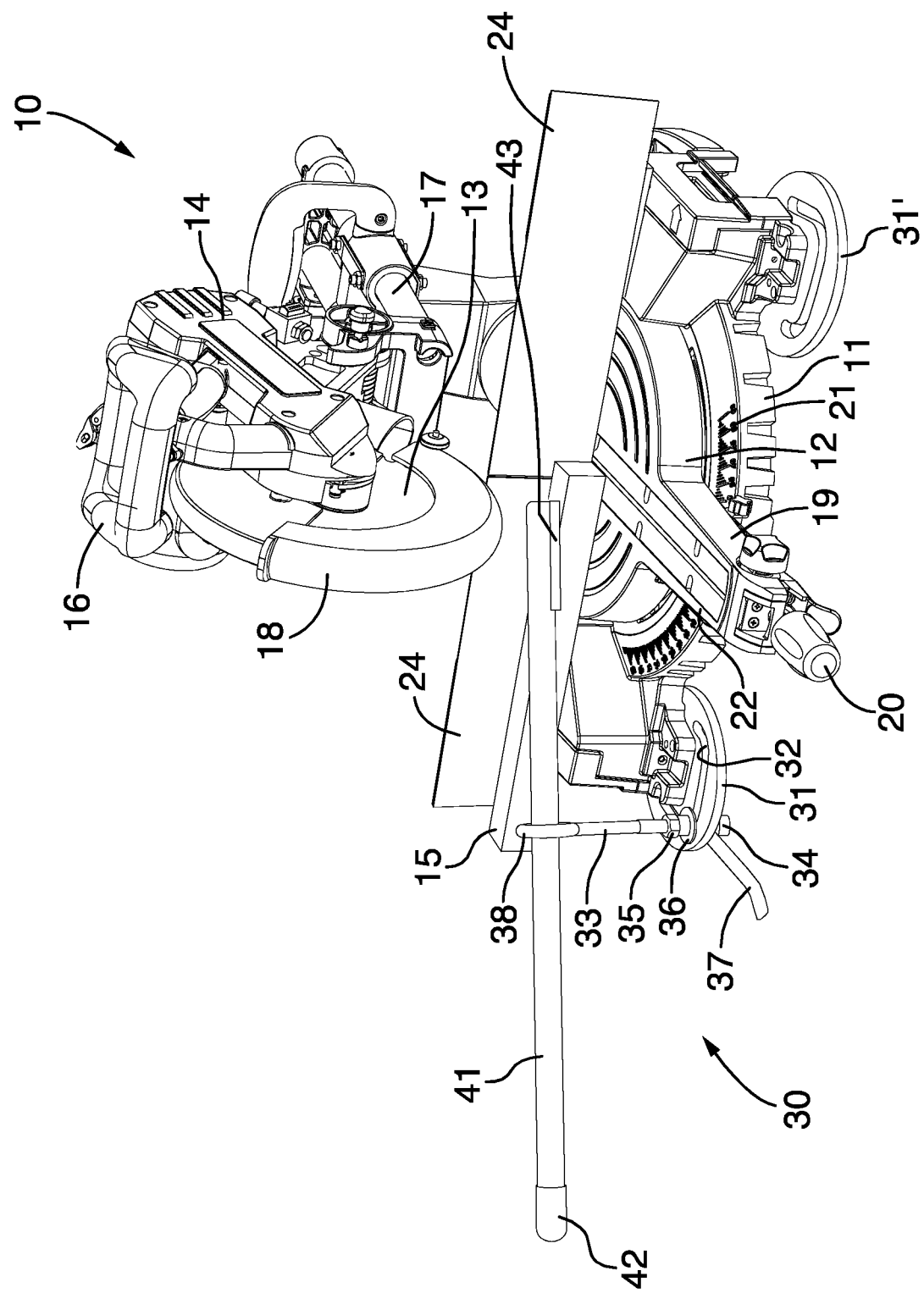
FIG. 2 depicts the miter saw of FIG. 1 showing the cylindrical rod being used in an alternative configuration.
Figure 3:
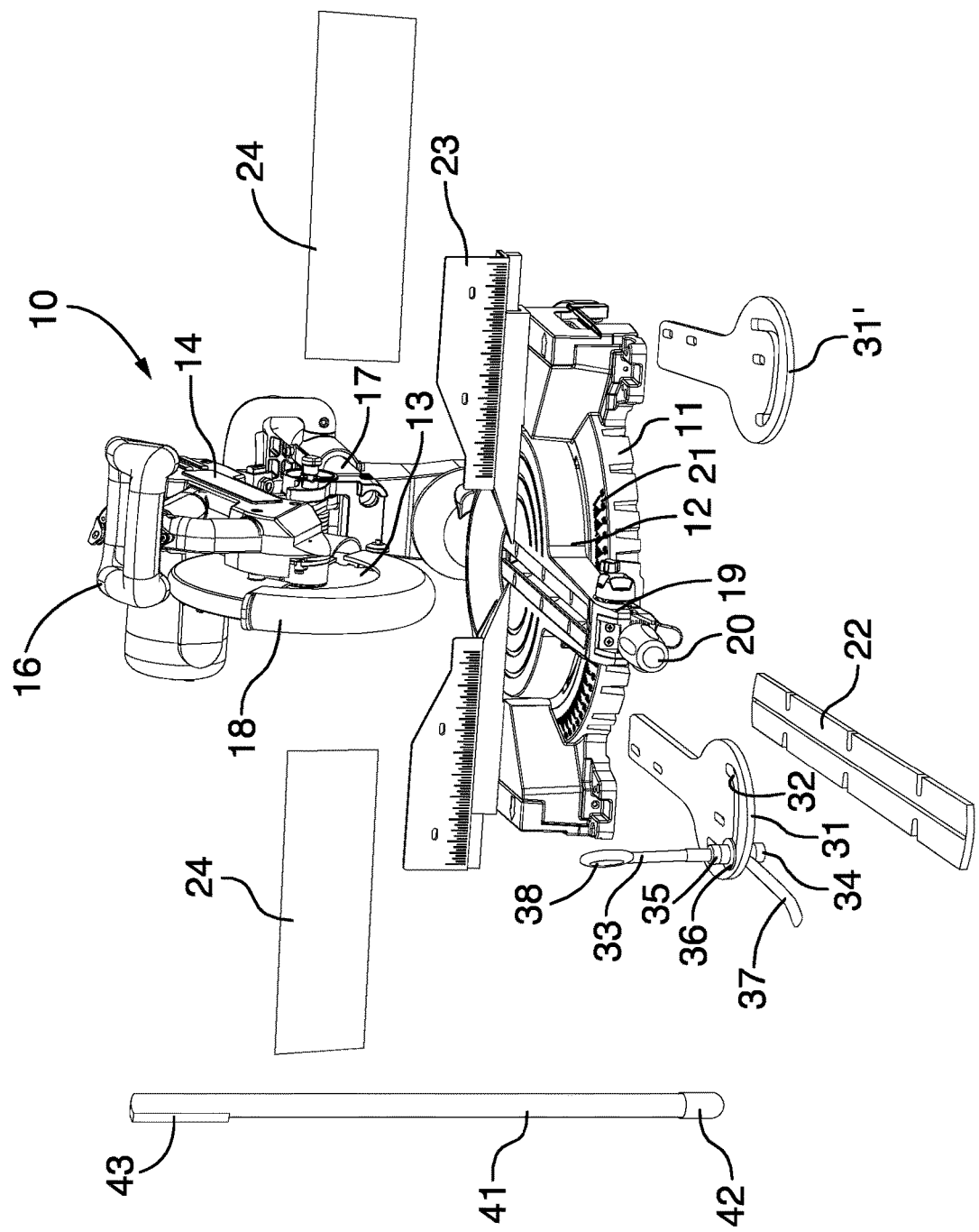
FIG. 3 depicts the miter saw of FIG. 1 showing parts disconnected from the miter saw.

FIG. 1, FIG. 2 and FIG. 3 depict a miter saw 10 having a first embodiment of a work-piece securing apparatus 30 mounted thereon. The miter saw 10 is a generally typical miter saw comprising a base 11, a turntable 12 supported on the base 11, and a circular saw blade 13 rotatably mounted on a pivoting arm 14, the saw blade 13 positioned above the turntable 12 to cut a work-piece 15 supported on the turntable 12. The pivoting arm 14 is pivotally mounted on the base 11 so that pulling down on a handle 16 causes slide rails 17 to translate horizontally backwards thereby causing the saw blade 13 to translate downward and backwards. The saw blade 13 is actuatable by an on/off switch for a motor located in the pivoting arm 14 and is equipped with a guard 18 to protect an operator from the rotating saw blade 13, the guard 18 pivoting upward and out of the way of the saw blade 13 before the saw blade 13 contacts the work-piece 15. The turntable 12 is rotatably mounted on the base 11 and may be rotated by urging a lever arm 19 in a horizontal direction. The lever arm 19 may be locked in place and unlocked using a miter lock handle 20. The exact angle of the miter cut to be made on the work-piece 15 may be set by rotating the turntable 12 to a desired position as indicated on a miter gauge 21 on the base 11. A blade guide 22 may be employed on the turntable 12 and a fence 23 provides a solid support for the bracing the work-piece 15 on the turntable 12. Fence extenders 24 may be used to enlarge the effective area of the fence 23 to provide additional support for the work-piece 15 on the turntable 12.

The work-piece securing apparatus 30 comprises a base plate 31 fixedly mounted on the base 11 of the miter saw 10. The base plate 31 may be fixedly mounted by any suitable method, for example welding, bolting and the like. The base plate 31 comprises an arcuate track 32 within which a pin, in this case an eyebolt 33, is releasably and movably mounted. The eyebolt 33 may be releasably and movably mounted in a vertical orientation in the track 32 on the base plate 31 with the use of nuts 34, 35 threaded on the eyebolt 33 below and above the base plate 31. One or more washers 36 may be used between the nuts 34, 35 and the base plate 31 to help secure the eyebolt 33 on the base plate 31 in the track 32. The nut 34 comprises a handle 37 to assist with tightening and loosening the nut 34. One or all of the nuts may comprise handles. The eyebolt 33 comprises an eye 38 through which a generally cylindrical rod 41 may extend and in which the rod 41 may be supported. The rod 41 comprises first and second ends, the first end comprising a butt sleeve 42, which is a rubber sheath 42 inserted over the first end of the rod 41, and the second end comprising a flat rubber pad 43 attached to one side of the second end of the rod 41.

In operation, the work-piece 15 is supported on the turntable 12 and against the fence extender 24 (or against the fence 23 if the fence extender 24 is not used) in a position below the saw blade 13 to be cut at a desired location along the work-piece 15. The turntable 12 may be rotated to provide a miter cut of a desired angle. To secure the work-piece 15 in the desired position on the turntable 12, an operator inserts the rod 41 through the eye 38 of the eyebolt 33, and engages an end of the rod 41 with the work-piece 15 at a desired point proximate, but not in, the desired cutting location. The rod 41 is used to brace the work-piece 15 against the fence extender 24 and/or on the turntable 12 by applying force through the rod 41. Depending on the desires of the operator, the skills of the operator and/or the nature (e.g., shape) of the work-piece 15 either the first end with the rubber sheath 42 (see FIG. 1) or the second end with the flat rubber pad 43 (see FIG. 2) may be engaged with the work-piece 15. There is sufficient tolerance between the rod 41 and the edges of the eye 38, and the diameter of the eye 38 in comparison to the thickness of the rod 41 is sufficiently large that the operator is able to angle the engagement end of rod 41 both vertically and horizontally to provide fine control over the positioning of the end of the rod 41 on the work-piece 15 and fine control over positioning the work-piece 15 on the turntable 12. To ensure that the eye 38 is correctly positioned to maximize the ability of the operator to manipulate the rod 41 against the work-piece 15, the eyebolt 33 may be moved in the track 32 to a selected location and/or rotated around a vertical axis to orient the eye 38 at a selected angle. Movement of the eyebolt 33 in the track and/or rotation of the eyebolt 33 around a vertical axis changes the direction in which the eye 38 points and therefore changes the direction in which the rod 41 generally points while extending through the eye 38. Loosening the nut 34 (and/or the nut 35) permits the eyebolt 33 to translate horizontally in the track 32 and permits the eyebolt 33 to rotate about a vertical axis. Re-tightening the nuts 34, 35 secures the eyebolt 33 to the base plate 31. Vertical height of the eye 38 may also be adjusted, if desired, by threading the nuts 34, 35 higher or lower on the eyebolt 33, however, the embodiment described in connection with FIG. 4 provides a more efficient way of adjusting the height of an eye.

The base plate 31 is mounted on the left side of the miter saw 10, and a second base plate 31' is fixedly mounted on the right side of the miter saw 10. The second base plate 31' has the same construction as the base plate 31 and embodies a portion of a second support element of a second work-piece securing apparatus for the miter saw 10. The second base plate 31' may be accompanied by a separate eyebolt and/or cylindrical rod, or the eyebolt and cylindrical rod associated with the base plate 31 may be transferred to the second base plate 31' in the event an operator wishes to secure the work-piece 15 from the right side of the miter saw 10. The nut 34 may be completely removed from the eyebolt 33 to permit dismounting of the eyebolt 33 from the base plate 31 to facilitate transfer of the eyebolt 33 and cylindrical rod 41 to the base plate 31' on the right side of the miter saw 10.

Figure 4:
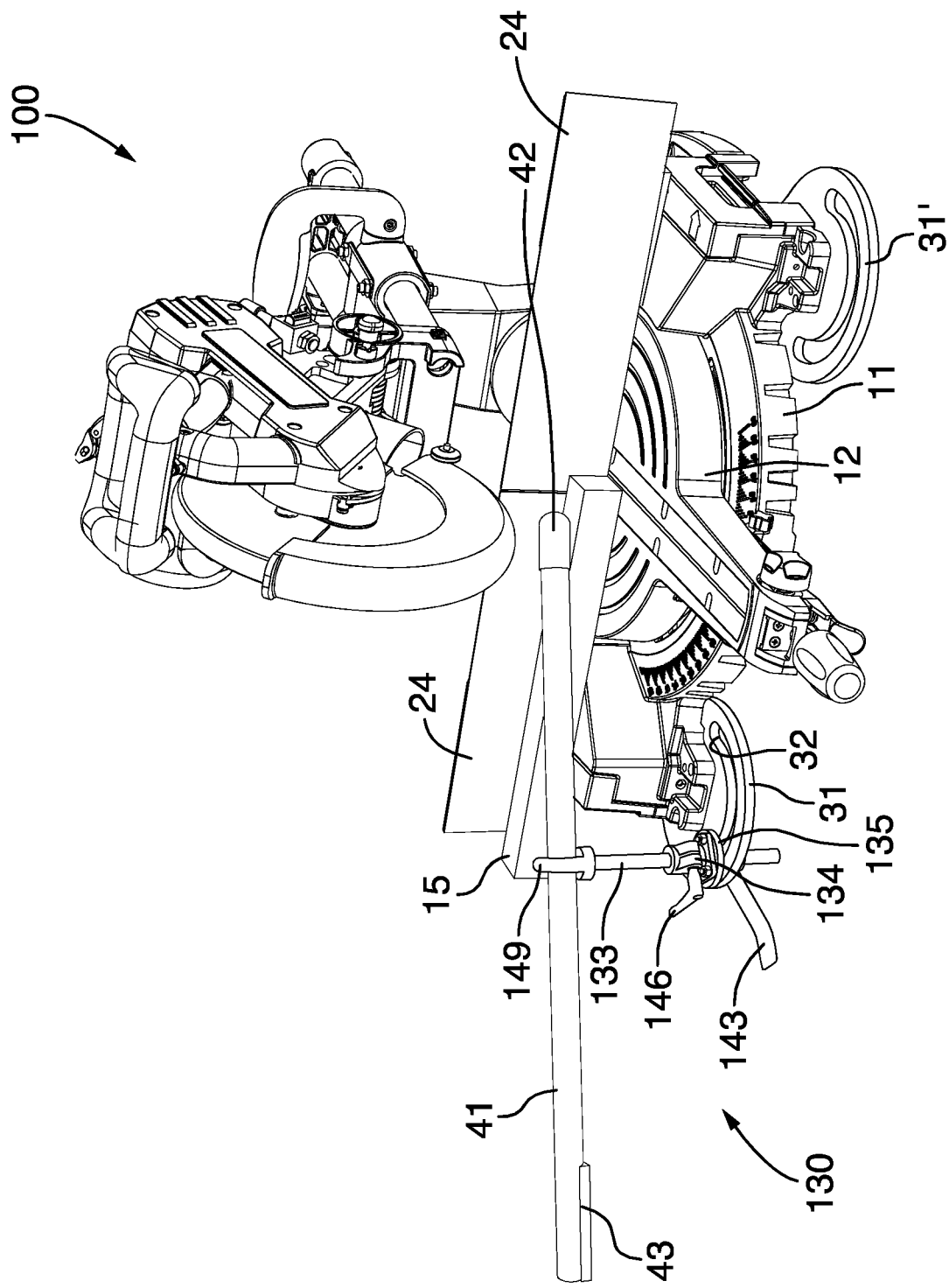
FIG. 4 depicts a miter saw having mounted thereon a second embodiment of a work-piece securing apparatus in which an elongated work-piece securing element comprises a generally cylindrical rod and a support element comprises a horizontally and vertically movable pin.
Figure 5:
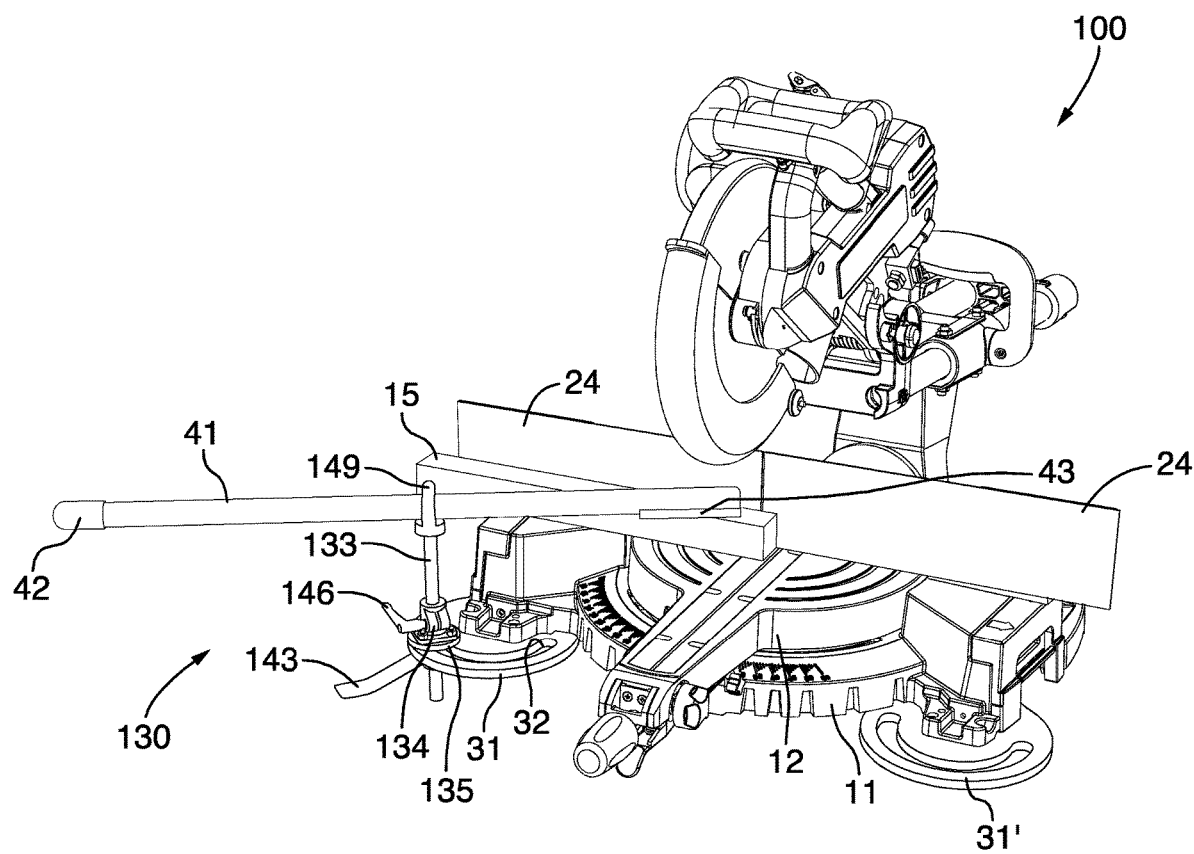
FIG. 5 depicts the miter saw of FIG. 4 showing the cylindrical rod being used in an alternative configuration.
Figure 6:
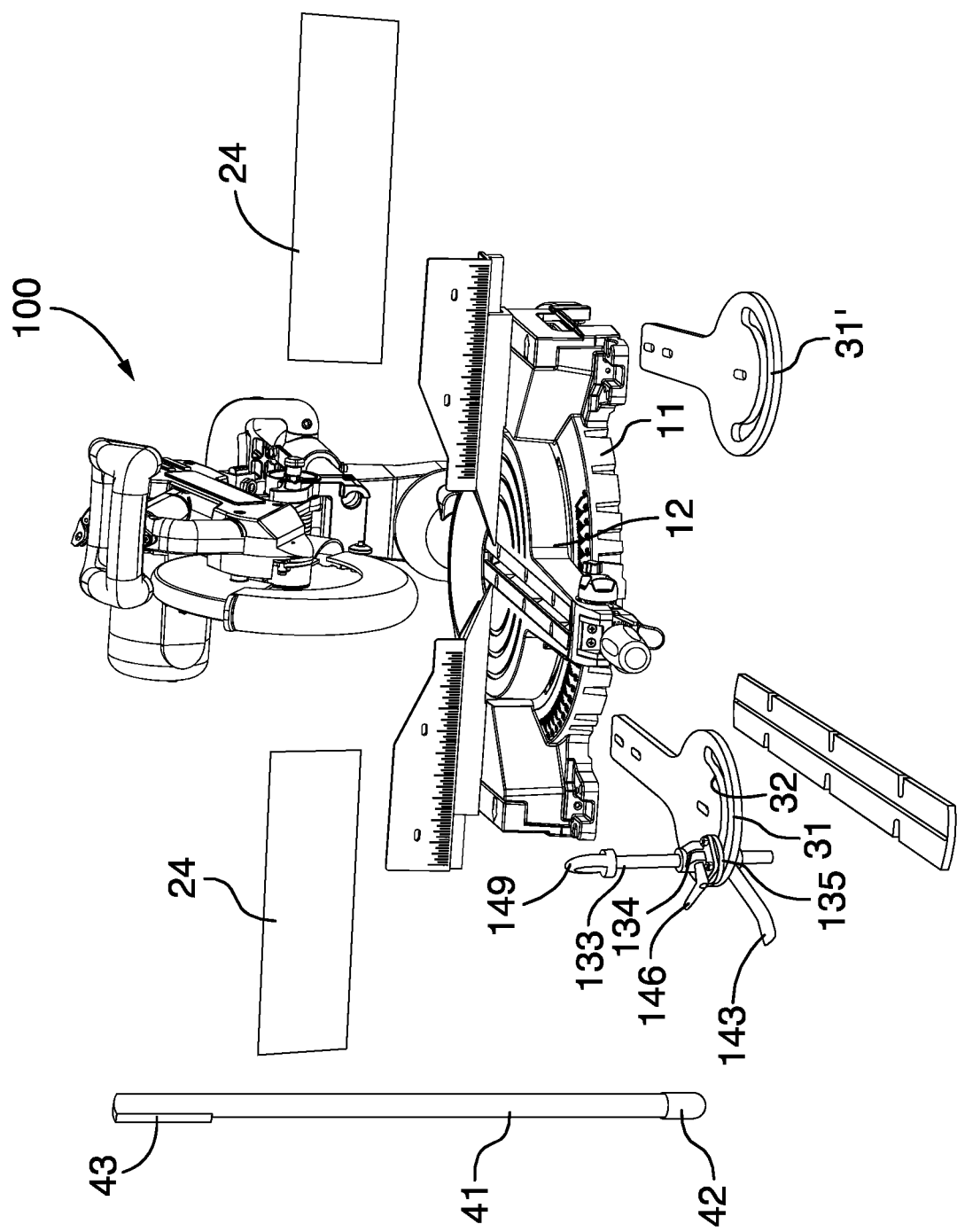
FIG. 6 depicts the miter saw of FIG. 4 showing parts disconnected from the miter saw.
Figure 7:
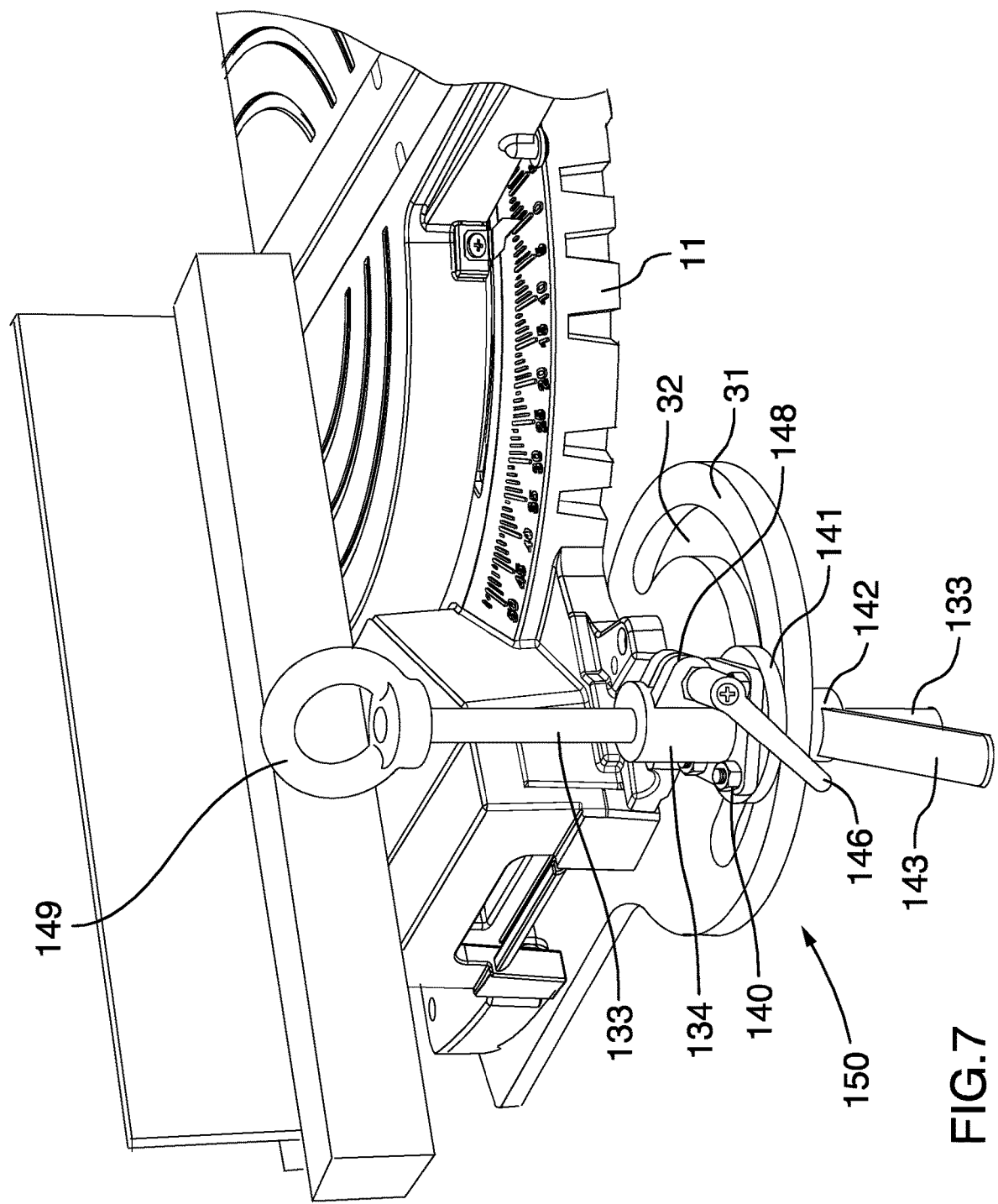
FIG. 7 depicts a magnified view of the support element seen in FIG. 4 with the pin in a vertically raised position.
Figure 8:
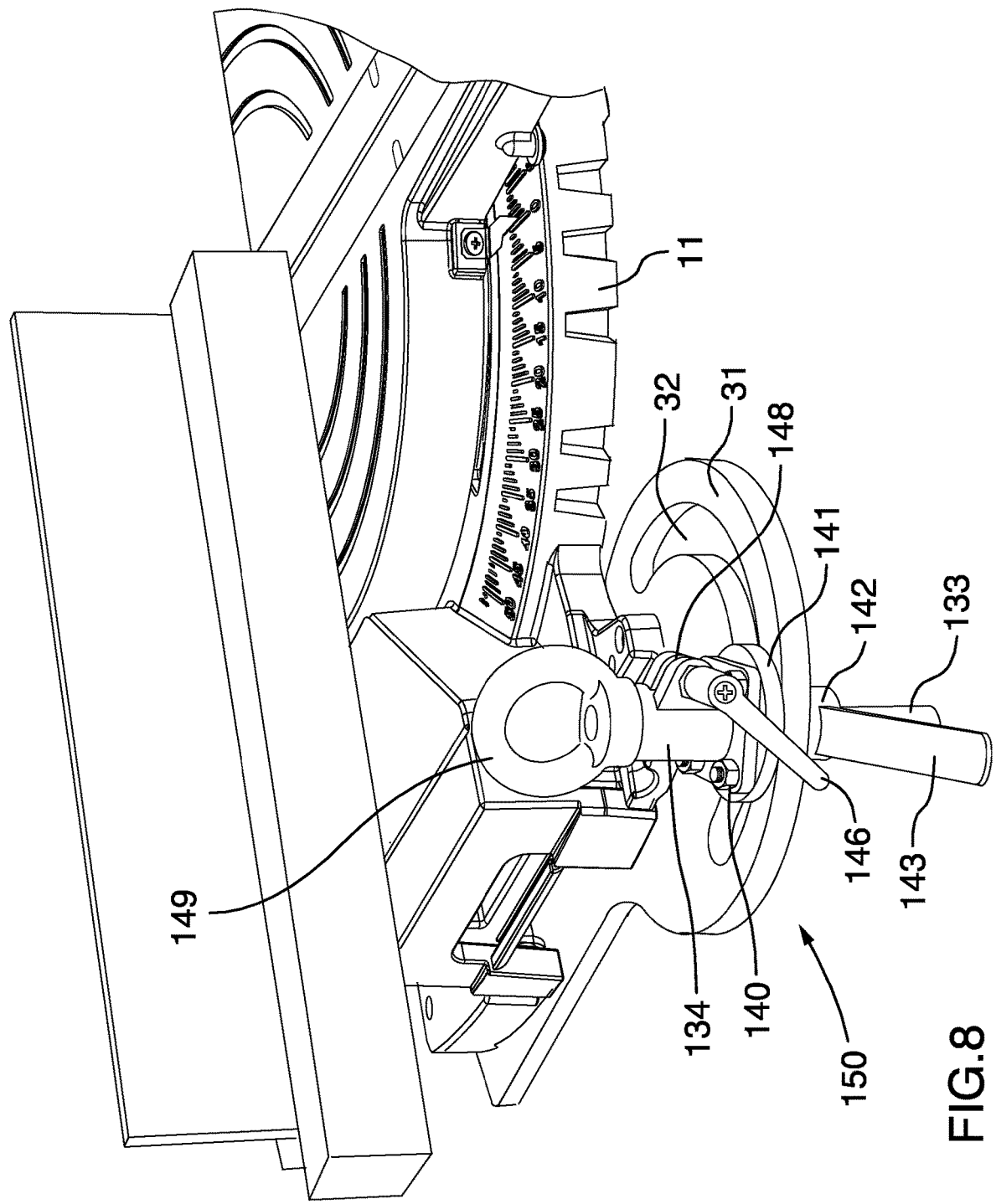
FIG. 8 depicts a magnified view of the support element seen in FIG. 4 with the pin in a vertically lowered position.
Figure 9:
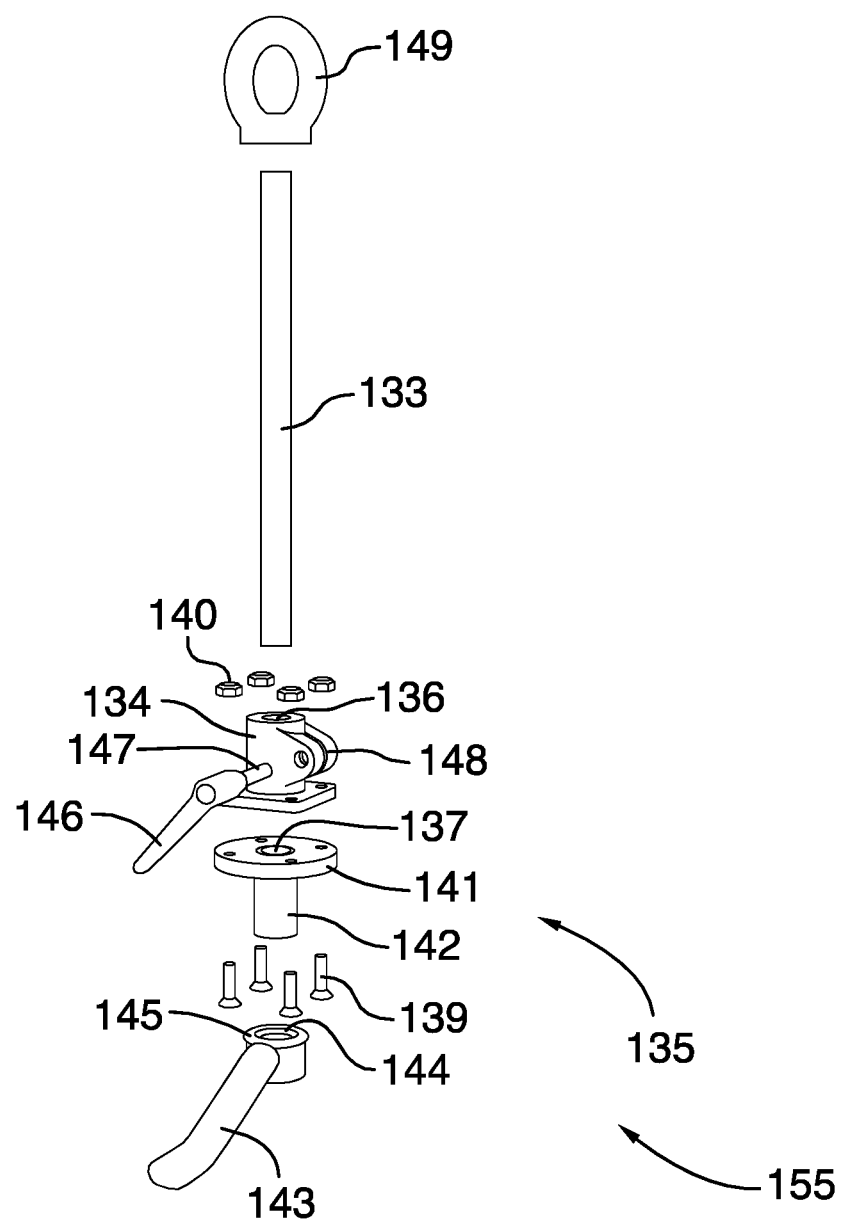
FIG. 9 depicts an exploded view of the pin and mounting structures for the pin seen in FIG. 4.

FIG. 4, FIG. 5 and FIG. 6 depict a miter saw 100 having a second embodiment of a work-piece securing apparatus 130 mounted thereon. FIG. 7 and FIG. 8 depict magnified views of a support element 150 of the work-piece securing apparatus 130, and FIG. 9 depicts an exploded view of a securing element mount 155 of the support element 150 of the work-piece securing apparatus 130. In many aspects, the miter saw 100 and the work-piece securing apparatus 130 comprise elements which are the same as the elements described in connection with the miter saw 10 of FIG. 1, FIG. 2 and FIG. 3. The following description of miter saw 100 focuses on the differences over miter saw 10; however, where numbered elements are the same elements in miter saws 10 and 100, the same numerals are used to identify the same elements.

In the embodiment illustrated in FIG. 4, FIG. 5, FIG. 6, FIG. 7, FIG. 8 and FIG. 9, the work-piece securing element 130 comprises the base plate 31 fixedly mounted on the base 11 of the miter saw 100. The base plate 31 comprises the arcuate track 32 within which a pin 133, is releasably and movably mounted. The pin 133 may be releasably and movably mounted in a vertical orientation in the track 32 on the base plate 31 with the use of a rod adapter 134 and a bearing 135. The rod adapter 134 comprises a first bore hole 136 through which the pin 133 extends and the bearing 135 comprises a second bore hole 137 aligned with the first bore hole 136 and through which the pin 133 also extends. The rod adapter 134 is secured to the bearing 135 by a set of nuts 140 and bolts 139. The bearing 135 comprises an annular disc 141 and a cylindrical bore 142, the annular disc resting on an upper surface of the base plate 31 and the cylindrical bore 142 extending through the track 32. With the rod adapter 134 secured to the bearing 135 and the pin 133 extending through the bore holes 136, 137, the pin 133 is mounted in the track 32 and translatable in a horizontal plane by moving the bearing 135 in the track 32. To secure the pin 133 in a selected location in the track 32, a locking handle 143 is used, the locking handle 143 comprising a third bore hole 144 within which the cylindrical bore 142 is frictionally engaged and through which the pin 133 extends. Frictional engagement of an inner surface of the third bore hole 144 with an outer surface of the cylindrical bore 142 and frictional engagement of an upper surface 145 around the third bore hole 144 of the locking handle 143 with a lower surface of the base plate 31 prevents translation of the bearing 135 in the track 32. By physically turning and lowering the locking handle 143, the bearing 135 may be released to permit translation of the bearing 135 in the track 32.

Vertical translation and rotational movement of the pin 133 may be readily controlled with a locking lever 146 on the rod adapter 134. The locking lever 146 comprises a bolt 147 that threadingly engages with a pair of opposed set nuts in opposed flanges 148 of the rod adapter 134. Tightening the locking lever 146 forces the flanges 148 together thereby reducing the diameter of the first bore hole 136 sufficiently so that inner surfaces of the first bore hole 136 frictionally engage the pin 133 preventing the pin 133 from translating vertically or rotating about a vertical axis. Loosening the locking lever 146 loosens the pin 133 in the first bore hole 136 of the rod adapter 134 permitting the pin 133 to be translated vertically to a selected location and to be rotated about a vertical axis to orient at a selected angle an eye 149 mounted on the pin 133. FIG. 7 and FIG. 8 depict the pin 133 raised and lowered with the eye 149 at different vertical locations. The eye 149 may be unitized with the pin 133, or may be a separate part that is mounted on the pin 133 frictionally or by virtue of a threaded connection or the like.

In a similar manner as described in connection with FIG. 1, FIG. 2 and FIG. 3, the generally cylindrical rod 41 may extend through and be supported by the eye 149. The rod 41 may be used in the same manner as described above to secure the work-piece 15 on the turntable 12 against the fence extender 24 (or the fence 23 if no fence extenders 24 are used).

While the drawings depict the base plate as a generally flat piece extending in a horizontal plane away from the base of the miter saw, the base plate may instead comprise a bend at or close to the base of the saw to angle the base plate up and towards to the miter saw. Therefore, a portion of the base plate with the track would be angled acutely with respect to a horizontal plane resulting in the pin pointing in a non-vertical orientation toward the miter saw. Such a configuration reduces a tripping hazard presented by the support element extending into a walking area around the miter saw because the base plate would not extend as far horizontally and the pin would extend in towards the miter saw. So that the rod may still be employed with maximum flexibility by the operator, the pin may be bent in the opposite direction as the bend in the base plate so that the eye remains oriented such that a central axis through the eye remains generally parallel to the horizontal plane.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A work-piece securing apparatus for metal-working or wood-working equipment, the apparatus comprising:
    a support element mountable on the equipment and an elongated work-piece securing element movably supported by the support element, the support element receiving and supporting the securing element such that the securing element retains mobility while supported by the support element to permit manual manipulation of the securing element to position a work-piece on the equipment and/or to position a work-piece engaging portion of the securing element at a desired contact point on the work-piece when the work-piece is positioned to be worked by a tool of the equipment,
    wherein the support element comprises a base plate and a securing element mount, the base plate configured to mount the support element to the equipment, the base plate comprising a track, and the securing element mount selectively movable in the track to two or more positions on the base plate,
    wherein the securing element mount comprises a pin, and the selective movement of the securing element mount in the track selectively moves the pin generally horizontally,
    wherein the securing element mount comprises a rod adapter from which the pin extends and within which the pin is generally vertically selectively movable, the rod adapter comprising a lock that releasably secures the pin within the rod adapter, and
    wherein the pin comprises a non-vertically oriented through-aperture through which the elongated work-piece securing element extends such that the elongated work-piece securing element is extendible horizontally through the through-aperture.

2. The apparatus according to claim 1, wherein the track is arcuate.

3. The apparatus according to claim 1, wherein the pin comprises a bolt extending into the rod adaptor, and the securing element mount is releasably secured at one of said two or more positions on the base plate by one or more pairs of nuts and bolts.

4. The apparatus according to claim 1, wherein the securing element comprises a generally cylindrical rod.

5. The apparatus according to claim 1, wherein the securing element comprises first and second ends, the first end having a generally circular cross-section and sheathed in a butt sleeve comprising a first elastomeric material, the second end having a flat portion comprising a second elastomeric material.

6. The apparatus according to claim 5, wherein the first and second elastomeric materials are the same or different and comprise an ethylene propylene diene monomer (EPDM) rubber, a polyurethane rubber or a natural rubber.

7. The apparatus according to claim 5, wherein the securing element comprises wood.

8. The apparatus according to claim 1, wherein the elongated work-piece securing element extends through the through-aperture with sufficient tolerance within the through-aperture to permit vertical and horizontal angling of the elongated work-piece securing element in the through-aperture to be able to position the work-piece engaging portion of the elongated work-piece securing element on the work-piece at the desired contact point on the work-piece without bending the elongated work-piece securing element, without moving the work-piece and without moving the securing element mount.

9. The apparatus according to claim 8, wherein the vertical and horizontal angling of the elongated work-piece securing element occurs at a fulcrum point located on the elongated work-piece securing element where the elongated work-piece securing element is supported in the through-aperture of the pin.

10. A metal-working or wood-working equipment comprising:
a base;
a work-piece table supported on the base;
a material working tool mounted on the base and configured to operate on a work-piece supported on the table; and
a work-piece securing apparatus configured to secure the work-piece on the table, the work-piece securing apparatus comprising:
a support element mounted on the base and an elongated work-piece securing element movably supported by the support element, the support element receiving and supporting the securing element such that the securing element retains mobility while supported by the support element to permit manual manipulation of the securing element to position the work-piece on the equipment and/or to position a work-piece engaging portion of the securing element at a desired contact point on the work-piece when the work-piece is positioned to be worked by the tool of the equipment,
wherein the support element comprises a base plate and a securing element mount, the base plate mounting the support element to the base, the base plate comprising a track, and the securing element mount selectively movable in the track to two or more positions on the base plate,
wherein the securing element mount comprises a pin, and the selective movement of the securing element mount in the track selectively moves the pin generally horizontally,
wherein the securing element mount comprises a rod adapter from which the pin extends and within which the pin is generally vertically selectively movable, the rod adapter comprising a lock that releasably secures the pin within the rod adapter, and
wherein the pin comprises a non-vertically oriented through-aperture through which the elongated work-piece securing element extends such that the elongated work-piece securing element is extendible horizontally through the through-aperture.

11. The equipment according to claim 10, wherein the track is arcuate.

12. The equipment according to claim 11, wherein the securing element comprises a generally cylindrical wooden rod having first and second ends, the first end having a generally circular cross-section and sheathed in a butt sleeve comprising a first elastomeric material, the second end having a flat portion comprising a second elastomeric material.

13. The equipment according to claim 12, wherein the equipment is a miter saw.

14. The equipment according to claim 10, wherein the elongated work-piece securing element extends through the through-aperture with sufficient tolerance within the through-aperture to permit vertical and horizontal angling of the elongated work-piece securing element in the through-aperture to be able to position the work-piece engaging portion of the elongated work-piece securing element on the work-piece at the desired contact point on the work-piece without bending the elongated work-piece securing element, without moving the work-piece and without moving the securing element mount.

15. The equipment according to claim 14, wherein the vertical and horizontal angling of the elongated work-piece securing element occurs at a fulcrum point located on the elongated work-piece securing element where the elongated work-piece securing element is supported in the through-aperture of the pin.

* * * * *